US008973989B2

(12) United States Patent
Oman et al.

(10) Patent No.: US 8,973,989 B2
(45) Date of Patent: Mar. 10, 2015

(54) OCCUPANT DETECTION SENSOR ASSEMBLY

(75) Inventors: Todd P. Oman, Greentown, IN (US); Richard P. Sickon, Rochester Hills, MI (US)

(73) Assignee: Delphi Technologies, Inc., Troy, MI (US)

( * ) Notice: Subject to any disclaimer, the term of this patent is extended or adjusted under 35 U.S.C. 154(b) by 387 days.

(21) Appl. No.: 13/364,904

(22) Filed: Feb. 2, 2012

(65) Prior Publication Data

US 2013/0200670 A1    Aug. 8, 2013

(51) Int. Cl.
*B60N 2/44*    (2006.01)

(52) U.S. Cl.
CPC .......................................... *B60N 2/44* (2013.01)
USPC ..................................... 297/217.2; 297/217.3

(58) Field of Classification Search
CPC ........................................................ B60N 2/44
USPC ............................................ 297/217.2, 217.3
See application file for complete search history.

(56) References Cited

U.S. PATENT DOCUMENTS

| 6,986,293 | B2 | 1/2006 | Dukart |
| 7,178,870 | B2 * | 2/2007 | Wolfe et al. ................. 297/217.2 |
| 7,246,850 | B2 * | 7/2007 | Steele ........................ 297/217.2 |
| 7,385,520 | B2 | 6/2008 | Patterson et al. |
| 7,431,450 | B2 * | 10/2008 | Huang ....................... 351/103 X |
| 7,463,161 | B2 | 12/2008 | Griffin et al. |
| 7,478,875 | B2 | 1/2009 | Patterson et al. |
| 7,567,181 | B1 | 7/2009 | Davison |
| 7,896,435 | B2 * | 3/2011 | Griffin et al. .......... 297/217.2 X |
| 7,992,937 | B2 * | 8/2011 | Plikat et al. ................ 297/300.2 |

FOREIGN PATENT DOCUMENTS

JP    2002-337588    11/2002

* cited by examiner

*Primary Examiner* — Anthony D Barfield
(74) *Attorney, Agent, or Firm* — Lawrence D. Hazelton

(57) ABSTRACT

A sensor system and seat assembly includes a sensor assembly configured to detect a seating force exerted on a portion of a seat cushion of a seat. The sensor assembly includes a base, a force transducer configured to output a signal indicative of the seating force, and a lever pivotably coupled to the base. The lever defines a sensing end configured to be disposed proximate to the portion of the seat cushion such that the seating force operates on the sensing end. The lever also defines an actuating end configured to apply an actuation force to the force transducer. The sensor assembly may comprise a plurality of levers. Each sensing end of each lever may be disposed in a separate location within the portion of the seat cushion. The sensor assembly may be configured to detect a child exerting a seating force on a portion of the seat cushion.

18 Claims, 6 Drawing Sheets

OCCUPANT DETECTION SENSOR ASSEMBLY

TECHNICAL FIELD OF THE INVENTION

The present invention is directed to a sensor system and a seat assembly including a sensor assembly configured to detect a force exerted on a seating surface of a seat.

BACKGROUND OF THE INVENTION

A child occupying a vehicle seat may distribute a seating force toward a perimeter portion of the seat cushion rather than in the central portions of the seat cushion typically contacted by an adult seat occupant. Seat occupant sensing devices such as a plate-type sensor or a bladder type sensor found in the prior art are typically disposed within the seat cushion and are configured to detect seating forces generally exerted on the central portion of the seat cushion. Enlarging the bladder or plate or using an arrangement of multiple sensors to detect seating forces exerted on the perimeter portion of the seat cushion undesirably increases the cost of the sensor and/or creates difficulties in packaging the sensor assembly within the seat cushion.

SUMMARY OF THE INVENTION

In accordance with one embodiment of this invention, a sensor assembly configured to detect a seating force exerted on a portion of a seat cushion of a seat is provided. The sensor assembly includes a base configured to be disposed within the seat. The sensor assembly further includes a force transducer coupled to the base and configured to output a signal indicative of the seating force. The sensor assembly also includes a lever pivotably coupled to the base. The lever defines a sensing end configured to be disposed proximate to the portion of the seat cushion such that the seating force operates on the sensing end. The lever defines an actuating end configured to apply an actuation force to the force transducer. The actuation force is proportional to the seating force.

In another embodiment of the present invention, the sensor assembly may further include a plurality of levers. Each sensing end of each lever in the plurality of levers may be disposed in a separate location within the portion of the seat cushion. A portion of the seating force may be applied to one or more of the sensing ends. One or more of the actuating ends may be configured to apply a corresponding portion of the actuation force to the force transducer.

In another embodiment of the present invention, a seat assembly configured to detect a seating force exerted on a portion of a seat cushion is provided. The seat assembly includes a seat cushion. The seat cushion defines a cavity. The seat assembly further includes a base configured to be disposed within the cavity. The seat assembly also includes a force transducer coupled to the base and configured to output a signal indicative of the seating force. The seat assembly additionally includes a lever pivotably coupled to the base. The lever defines a sensing end disposed proximate to the portion of the seat cushion such that the seating force operates on the sensing end. The lever defines an actuating end configured to apply an actuation force to the force transducer. The actuation force is proportional to the seating force.

In yet another embodiment of the present invention, a sensor system configured to detect a seating force exerted on a portion of a seat cushion of a seat is provided. The sensor system includes a base configured to be disposed within a seat. The sensor system also includes a force transducer coupled to the base and configured to output a signal indicative of the seating force. The sensor system further includes a lever pivotably coupled to the base. The lever defines a sensing end configured to be disposed proximate to the portion of the seat cushion such that the seating force operates on the sensing end. The lever defines an actuating end configured to apply an actuation force to the force transducer. The actuation force is proportional to the seating force. The sensor system additionally includes a control unit.

Further features and advantages of the invention will appear more clearly on a reading of the following detailed description of the disclosed embodiments, which is given by way of non-limiting example only and with reference to the accompanying drawings.

BRIEF DESCRIPTION OF DRAWINGS

The embodiments of the invention will now be described, by way of example with reference to the accompanying drawings, in which.

DETAILED DESCRIPTION OF THE INVENTION

Figure 1:
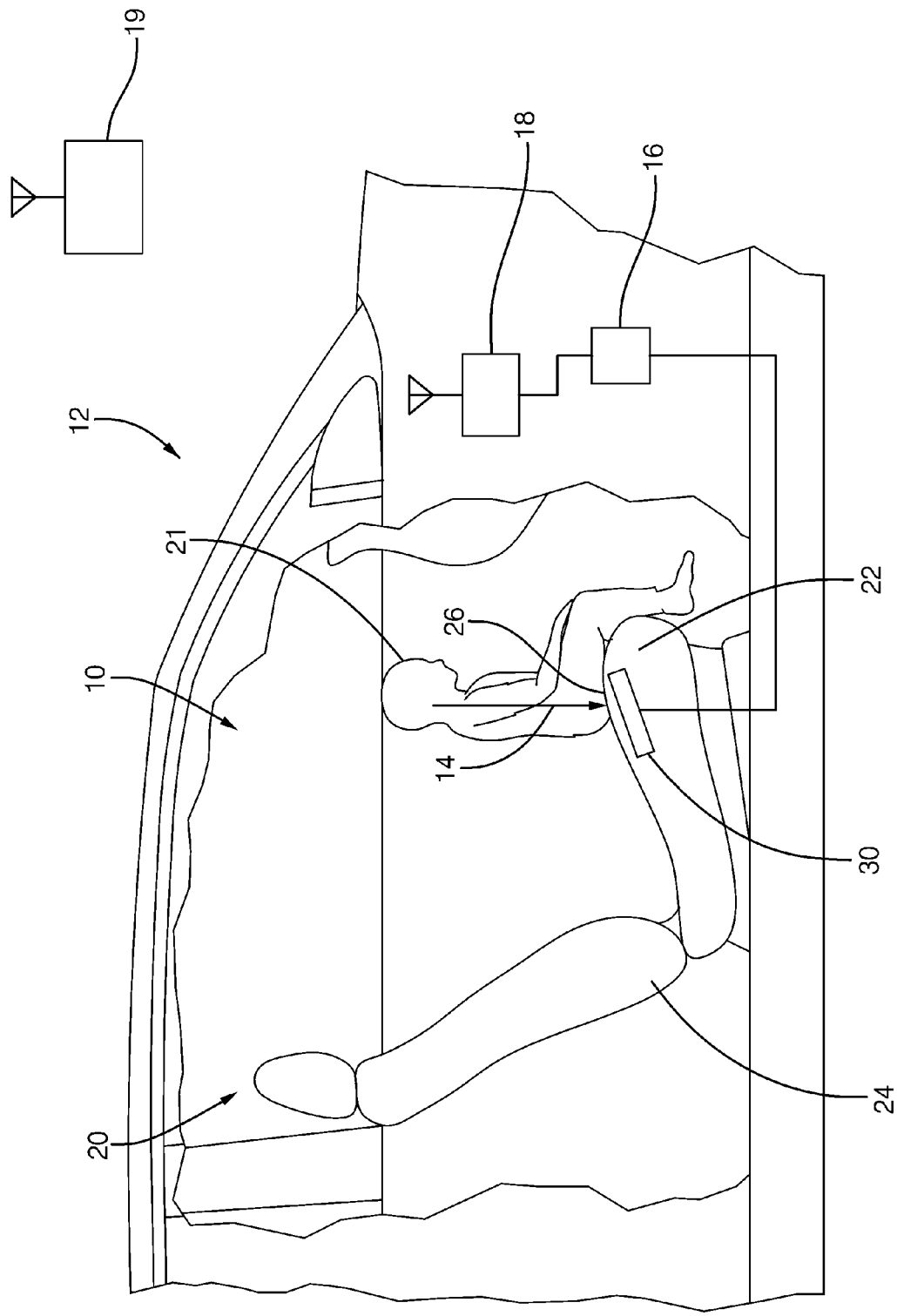
FIG. 1 illustrates a cut-away side view of a vehicle having a sensor system including a sensor assembly disposed within a seat assembly in accordance with one embodiment.

Similar elements in the various disclosed embodiments are identified by reference numbers wherein the last two digits of the reference number are identical. The first digit of the reference number may indicate the drawing figure in which the element is first identified.

A child occupying a seat may contact a seat cushion in a perimeter portion of the seat cushion rather than in the central portions of the seat cushion typically contacted by an adult seat occupant. As such, it may be preferable to equip the seat cushion with a sensor assembly that is capable of detecting a seating force applied to a perimeter portion of the seat cushion separate from the portion typically contacted by an adult occupant to detect the presence sitting on the seat.

In accordance with an embodiment of a sensor system 10, FIG. 1 illustrates a non-limiting example of a sensor system 10 configured for use in a vehicle 12 to detect the presence of a child 21 on a seat bottom cushion 22 of a seat assembly 20. The seat assembly 20 includes the seat bottom cushion 22 and a seat back cushion 24. A sensor assembly 30 is disposed within the seat assembly 20 and is configured to detect a seating force 14 exerted on a portion of the seat cushion 26 by the child 21, particularly if the child 21 is sitting on the edge of the seat bottom cushion 22 as illustrated. In this example the seating force 14 is exerted on a front portion of a seat bottom cushion 22 by the child 21. The sensor assembly 30 may detect the seating force 14 on a portion of the seat bottom cushion 22, in this example the front portion of the seat bottom cushion 22 that is not normally occupied by an adult passenger sitting on the seat bottom cushion 22.

The sensor system 10 may alternatively be configured to detect the seating force 14 exerted on the portion of the seat cushion 26 to detect other types of seat occupants including, but not limited to, adults, child safety seats, pets, and packages.

The sensor system 10 also includes a control unit 16 in communication with the sensor assembly 30. The control unit 16 may be disposed within the vehicle 12 or alternatively, the control unit 16 may be disposed within the seat assembly 20. The control unit 16 may be configured to trigger a response within the vehicle 12 to the presence or absence of the seating force 14 on the portion of the seat cushion 26, such as illuminating a warning light (not shown). Alternatively, the control unit 16 may establish a communication link via a wireless transmitter 18 located in the vehicle 12, to a receiver 19 that may be external to the vehicle 12 in order to alert a user to the presence or absence of an occupant on the portion of the seat cushion 26. The control unit 16 is preferably an electronic control unit in electrical communication with the sensor assembly 30. The electrical communication between the control unit 16 and the sensor assembly 30 may be established by the vehicle's wiring harness. The control unit 16 may alternatively be a hydraulic control unit in hydraulic communication with the sensor assembly 30 or a pneumatic control unit in pneumatic communication with the sensor assembly 30.

Although the preceding example describes detecting a child 21 in a vehicle 12, other embodiments of the sensor system 10 may be proposed to detect seating forces generated by other seat occupants in different seating environments and applications. Additionally, although the seat assembly 20 in the preceding example is illustrated in a front seat of a vehicle 12, the seat assembly 20 may be located in a rear seat, third row seat, etc.

Figure 2:
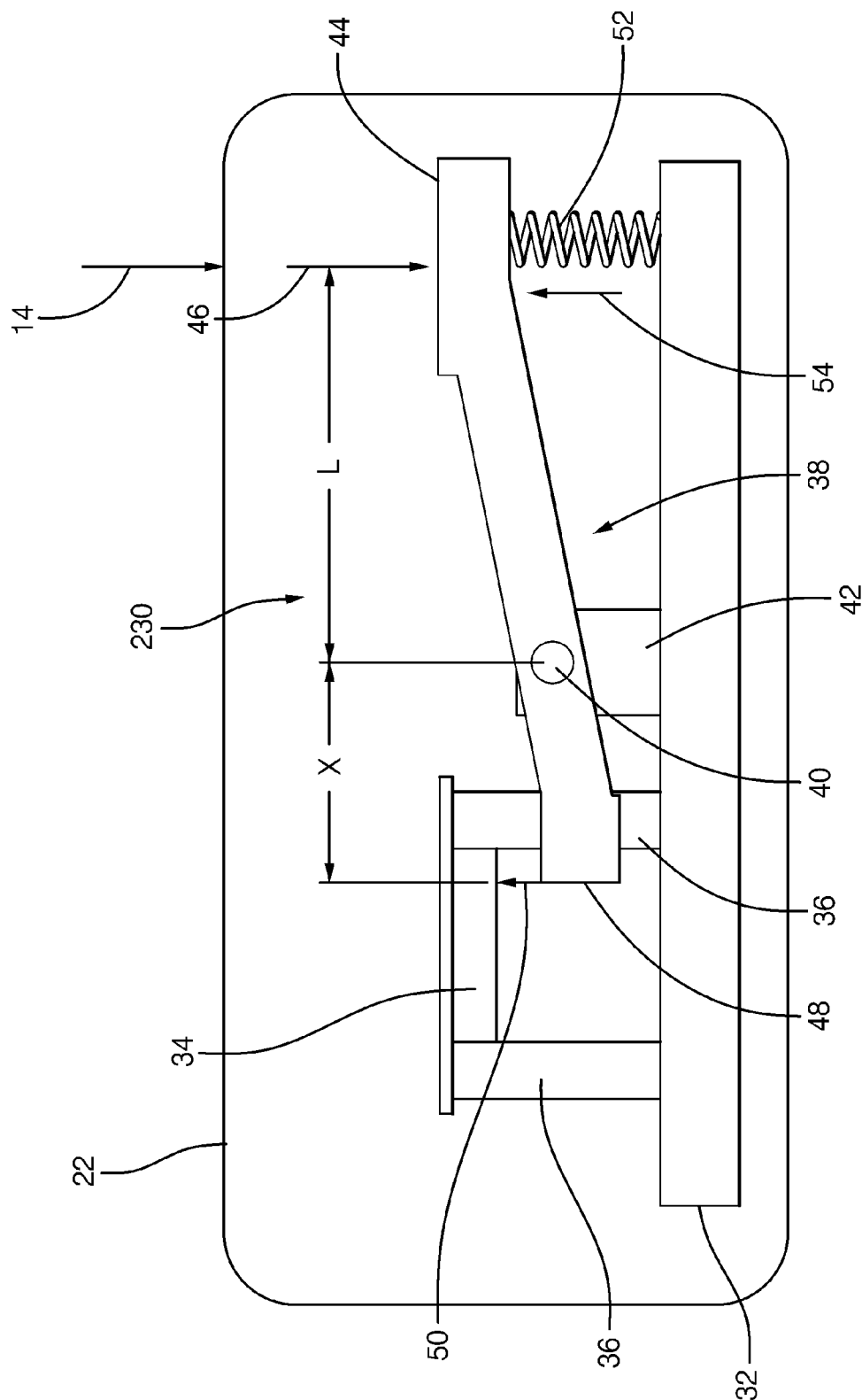
FIG. 2 illustrates a cross-sectional side view of a sensor assembly in accordance with a first embodiment.

In accordance with a first embodiment of a sensor assembly 230, FIG. 2 illustrates a non-limiting example of the sensor assembly 230 configured to detect the seating force 14 exerted on the portion of a seat cushion 26 of the seat assembly 20. The sensor assembly 230 includes a base 32 configured to be disposed within the seat assembly 20, preferably within the seat bottom cushion 22. The base 32 may be configured to be mounted to a seat frame. A force transducer 34 is coupled to the base 32, in this example by a plurality of support posts 36, and is configured to output a signal indicative of the seating force 14. The support posts 36 may be integrally formed into the base 32. A lever 38 is pivotably coupled to the base 32 by a pivot pin 40 affixed to the base 32 by a support slot 42. The lever 38 defines a sensing end 44 configured to be disposed proximate to the portion of the seat cushion 26 such that a seating force 46 applied by the portion of the seat cushion 26 to the sensing end 44 operates on the sensing end 44. The seating force 46 is dependent on the seating force 14 applied to the portion of the seat cushion 26. The magnitude of the seating force 46 applied to the sensing end 44 may be lower than the seating force 14 applied to the portion of the seat cushion 26 due to compression of the portion of the seat cushion 26. The lever 38 further defines an actuating end 48 configured to apply an actuation force 50 to the force transducer 34. The application of the seating force 46 to the sensing end 44 causes the application of the actuation force 50 to the force transducer 34.

The lever 38, pivot pin 40, support posts 36, and base 32 may be constructed of a material sufficient to withstand the forces applied to the sensor assembly 230 by the seating force 46. Preferably the base 32, support posts 36, and lever 38 are constructed of a plastic such as acrylonitrile butadiene styrene (ABS).

The sensor assembly 230 provides the advantage of determining the seating force 46 applied to a portion of the seat cushion 26 that is in a location remote from the force transducer 34. This may offer a designer of a seat assembly 20 more flexibility in determining a component packaging location for the sensor assembly 230.

The sensor assembly 230 does not rely on the deflection, bending, or deformation of the lever 38 to detect the seating force 14 on the portion of the seat cushion 26 as the lever 38 is substantially non-compliant. As used herein, a substantially non-compliant lever 38 exhibits a transverse deflection that is less than 10% of the length of the lever 38 from the sensing end 44 to the pivot pin 40 (L) or the length of the actuation end to the pivot pin 40 (X) when a maximum seating force 46 is applied to the sensor assembly 230.

The actuation force 50 applied to the force transducer 34 by the actuating end 48 is proportional to the seating force 46 applied to the sensing end 44 of the lever 38. It will be recognized that this proportional relationship is the ratio of the length of the lever 38 from the sensing end 44 to the pivot pin 40 (L) and the length of the actuation end to the pivot pin 40 (X), that is $50=(L/X)*46$.

Figure 5:
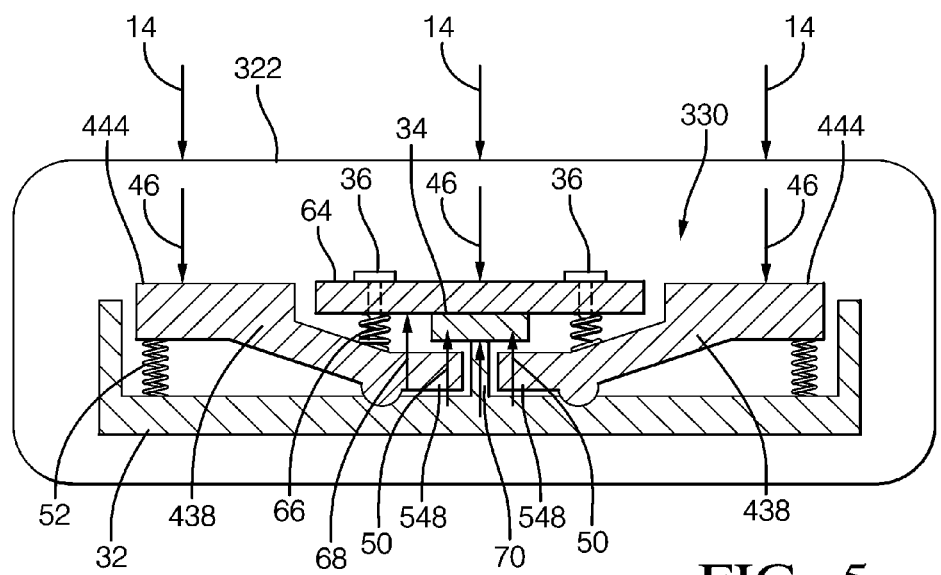
FIG. 5 illustrates a cross-sectional side view of the sensor assembly of FIG. 4 along the section line A-A in accordance with the second embodiment.
Figure 8:
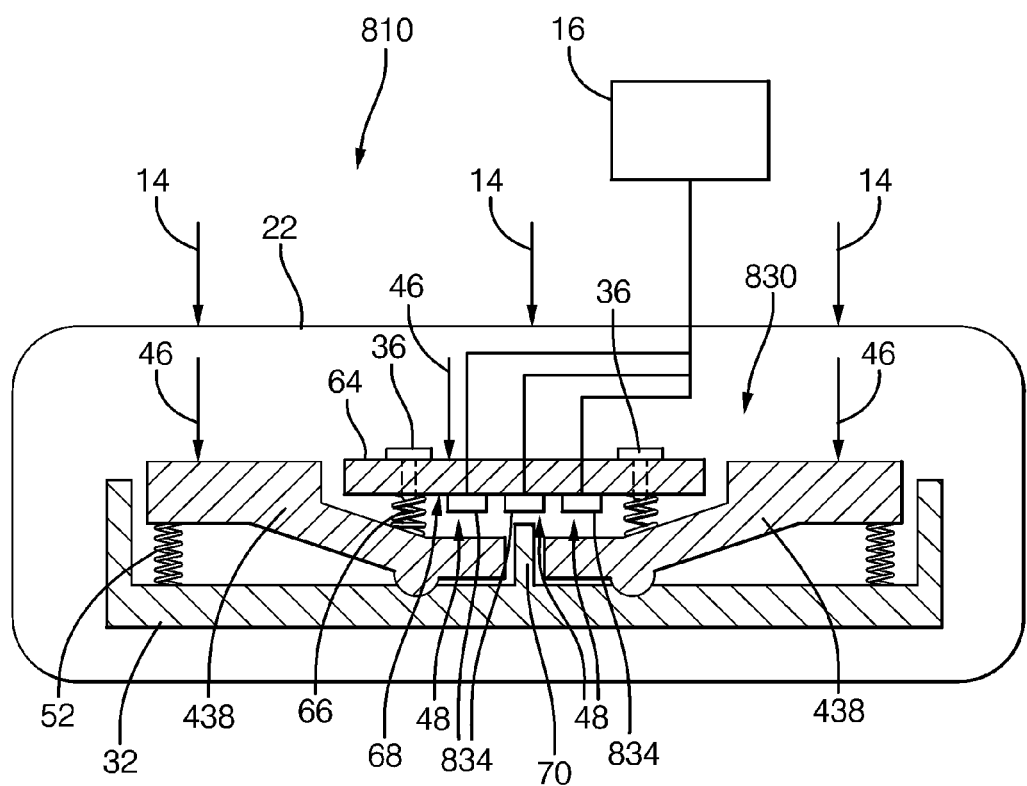
FIG. 8 illustrates a cross sectional side view of a sensor assembly in accordance with a fifth embodiment in a sensor system.

As illustrated in FIG. 2, the sensor assembly 230 may further include a lever spring 52 coupled to the base 32 and the lever 38. The lever spring 52 is configured to exert a lever spring force 54 on the lever 38 effective to change the magnitude of the actuation force 50 relative to the seating force 46. It will be recognized that the resultant relationship of the actuation force 50 to the seating force 46 is $50=((L/X)*46)-54$. The lever spring 52 may be a compression spring, extension spring, leaf spring, cantilever spring, elastomeric spring, or a torsion spring integrated into the fulcrum of the lever 38. The lever spring 52 may be configured so that the lever spring force 54 decreases the actuation force 50 applied to the force transducer 34. Alternatively, the lever spring 52 may be configured so that the lever spring force 54 increases the actuation force 50 applied to the force transducer 34. The length of the arrows representing the seating force 14, 46, actuation force 50, and lever spring force 54 in FIGS. 2, 5, and 8 are not intended to indicate or imply relative values between any of these illustrated forces.

In some embodiments of the seat sensor, it may only be necessary to detect whether the seating force 14 applied to the portion of the seat cushion 26 exceeds a specified threshold force. A signal value of the signal output by the force transducer 34 has a first value when the actuation force 50 is below a threshold, and the signal value may has second value when the actuation force 50 is above the threshold. The force transducer 34 may be a dome switch such as those available from Snaptron, Inc. of Windsor Colo. In one embodiment, the switch is off (first value) until the activation force applied to the force switch exceeds a dome switch force threshold, thereby turning the dome switch on (second value). Alternatively, the switch may be on (first value) until the activation force applied to the force switch exceeds the dome switch force threshold, thereby turning the dome switch off (second value). The lengths L and X of the lever 38 and the lever spring force 54 may be chosen so that the activation force applied by the actuation end is greater than the dome switch force threshold when the seating force 46 applied to the sensing end 44 exceeds a specified threshold seating force.

In other embodiments of the sensor assembly 30, it may be desired to detect a value of seating force 14 applied to the portion of the seat cushion 26. Therefore, in these embodiments, the signal value of the force transducer 34 may be proportional to the actuation force 50. The force transducer 34 is preferably an electric force transducer, i.e. converting force values to electric values. In these embodiments, the force transducer 34 may be a quartz piezoelectric force transducer, such as those available from Kistler Instrument Corporation of Amherst, N.Y. The quartz piezoelectric force transducer produces an electric charge proportional to the actuation force 50 applied. Alternatively, embodiments may be envisioned wherein a hydraulic or pneumatic force transducer may be desired.

The sensor assembly 30 provides the advantage of detecting a seating force 14 exerted on a small portion of the seat cushion 26. The seating force 46 applied to the sensing end 44 the seating force 14 is transmitted to the actuating end 48 of the lever 38 with very little mechanical loss due to the rigidity or non-compliance of the lever 38. In contrast, when a seating force is exerted on a small portion of a seat cushion incorporating a bladder-type pressure sensor, a portion of the seating force causes deformation of the bladder rather than being detected by the bladder. Additionally, the sensor assembly 30 offer the advantage of detecting seating forces on portions of the seat cushion, such as the perimeter of the seat cushion that could not be detected by bladder-type or plate-type pressure sensor that typically are only capable of detecting seating forces in the central portions of the seat cushion. Accordingly, the sensor assembly 30 may be capable of detecting seating forces exerted by, but not limited to, children, child safety seats, pets, or packages.

Figure 3:
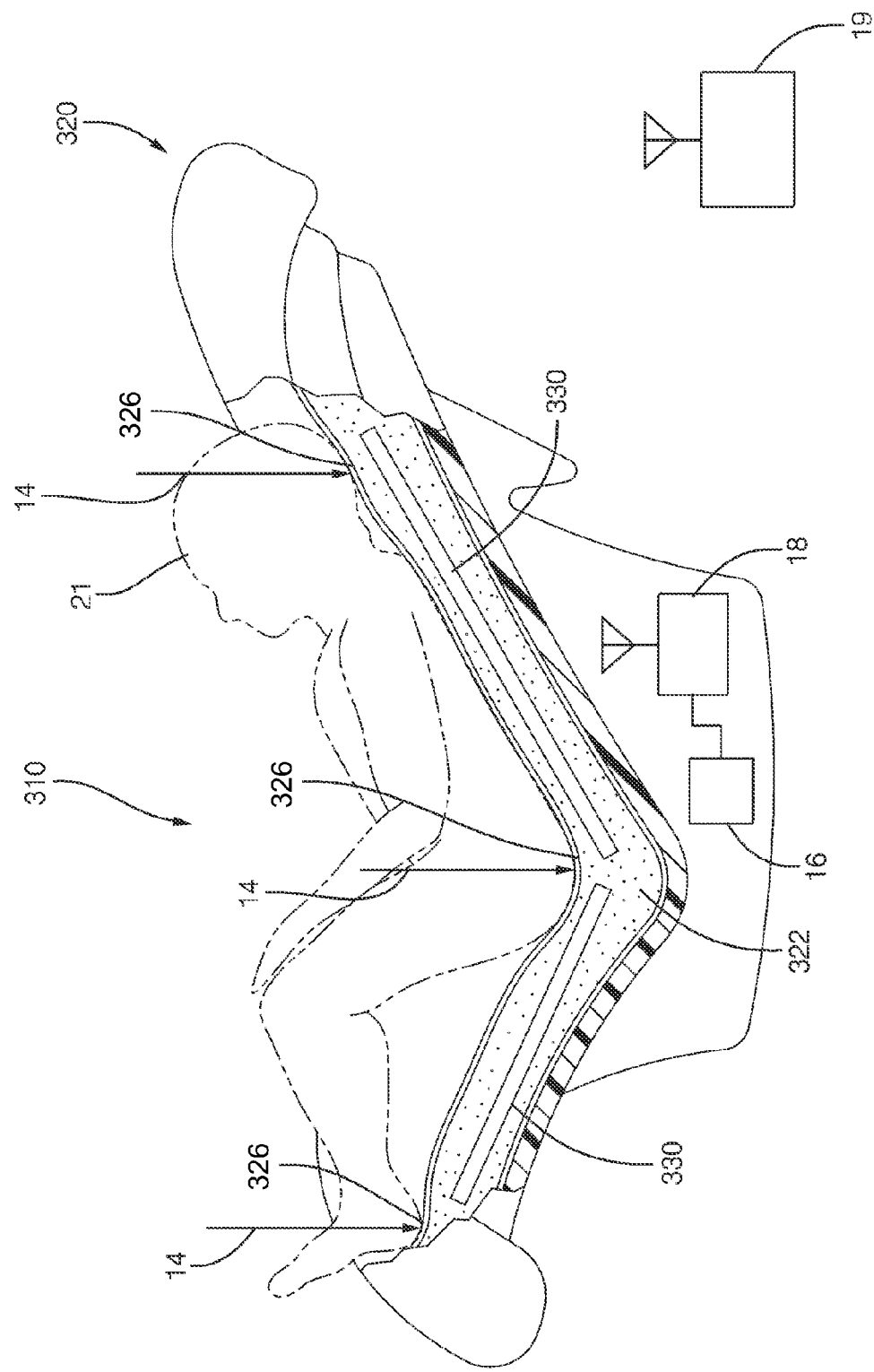
FIG. 3 illustrates a cut-away side view of a child safety seat having the sensor assembly of FIG. 2 disposed within the child safety seat.

FIG. 3 illustrates a non-limiting example of a sensor system 310 adapted for use in with child safety seat assembly 320. A child 21 occupying the seat assembly 320 may exert a seating force 14 on a seat bottom cushion 322 within the seat assembly 320 in one of a number of different potions of the seat cushion 326. Therefore, a sensor assembly 330 that is capable of detecting a seating force 14 applied in one or a number of different portions of the seat cushion 26 may successfully detect the presence of the child 21 in the seat assembly 320.

In accordance with an embodiment of a seat assembly 320, FIG. 3 illustrates a non-limiting example of a seat assembly 320 having a sensor assembly 330 to detect the presence of a child 21 or other occupant on a portion of the seat cushion 26 of the seat assembly 320. The sensor assembly 330 is disposed within the seat assembly 320 and is configured to detect a seating force 14 exerted on a portion of the seat cushion 26, by the child 21. The control unit 16 is in communication with the sensor assembly 330. The control unit 16 may be disposed within the seat assembly 320 or may be affixed to the vehicle 12. The control unit 16 may be configured to trigger a response within the vehicle 12 to the presence or absence of the seating force 14 on the portion of the seat cushion 26, such as illuminating a warning light (not shown). Alternatively, the control unit 16 may establish a communication link via a wireless transmitter 18 to a receiver 19 that may be external to the vehicle 12 in order to alert a user to the presence or absence of the child 21 on the portion of the seat cushion 26. The wireless transmitter 18 may also be disposed within the seat assembly 320.

Figure 4:
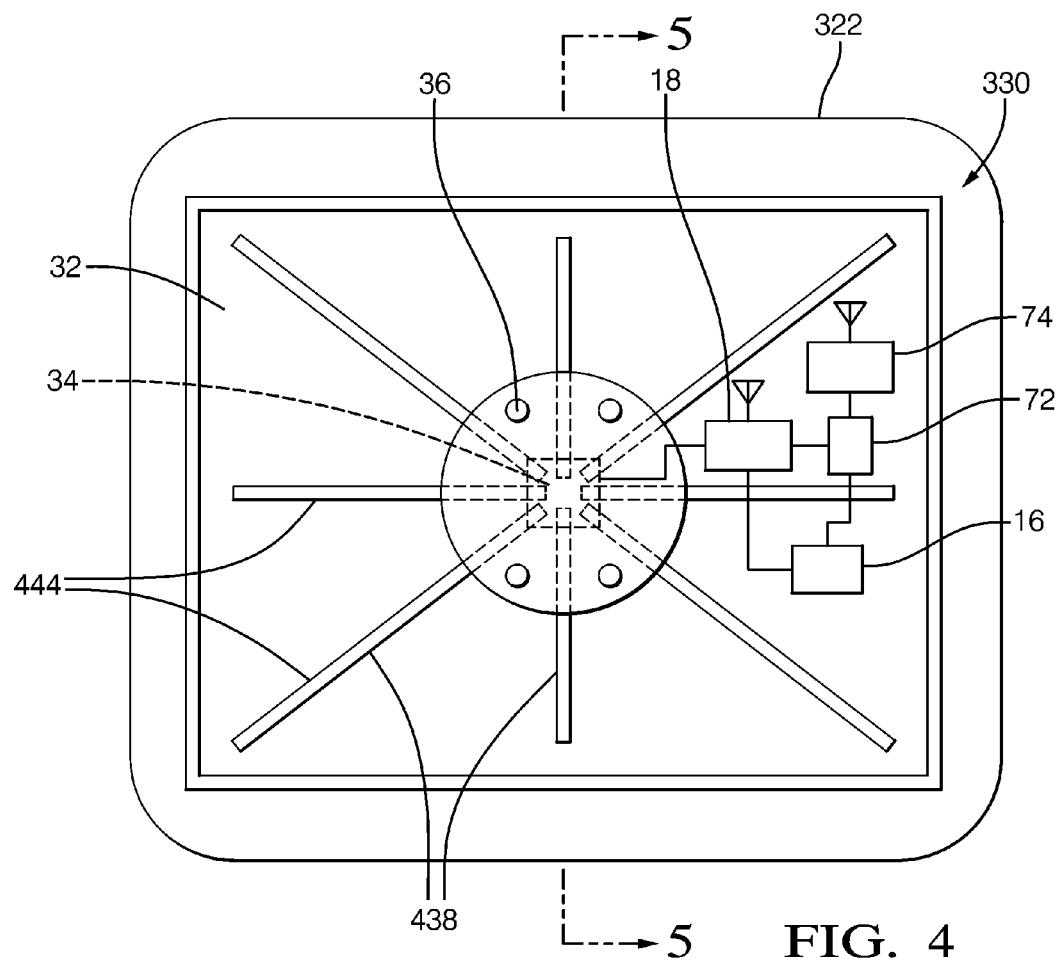
FIG. 4 illustrates a top view of a sensor assembly disposed within a seat cushion in accordance with a second embodiment.

In accordance with a second embodiment of a sensor assembly 330, FIG. 4 illustrates a non-limiting example of the sensor assembly 330 further including a plurality of levers 438. Each sensing end 444 of each lever in the plurality of levers 438 is disposed in a separate portion of the seat cushion 26.

As shown in FIG. 5, a portion of the seating force 46 is applied to one or more of the sensing ends 444. One or more of the actuating ends 548 is configured to apply a corresponding portion of the actuation force 50 to the force transducer 34. The application of a portion of the seating force 46 to one or more of the sensing ends 444 causes a corresponding portion of the actuation force 50 to be applied to the force transducer 34 by one or more of the corresponding actuating ends 548. The actuating ends 548 of each lever in the plurality of levers 438 are disposed proximate to the force transducer 34 in a location effective to apply a portion of the actuating force to the force transducer 34.

In embodiments of the sensor assembly 330 where it necessary to detect whether the seating force 14 applied to the portion of the seat cushion 26 exceeds a specified threshold force, the signal value of the signal output by the force transducer 34 has a first value when the total actuation force 50 applied by each of the actuating ends 548 is below a threshold, and the signal value may has second value when the total actuation force 50 applied by each of the actuating ends 548. In other embodiments of the sensor assembly 330, it may be desired to detect a value of seating force 14 applied to the portion of the seat cushion 26. Therefore, in these embodiments, the signal value of the force transducer 34 may be proportional to the total actuation force 50 applied by each of the actuating ends 548.

The plurality of levers 438 in the sensor assembly 330 provides the advantage of determining the seating force 14 applied to a portion of the seat cushion 26 in two or more distinct locations. Therefore, the sensor assembly 330 disposed in the child safety seat assembly 320 may be capable of detecting a seating force 14 exerted by a child 21 in a number of different locations on the seat bottom cushion 322.

The plurality of levers 438 in the sensor assembly 330 also provides the advantage of detecting seating forces 14 in portions of the seat cushion 26, such as the perimeter of the seat bottom cushion 22. This may provide an ability to detect seating forces on a seat cushion 26 exerted by a child safety seat that only contacts the seat bottom cushion 22 on the perimeter of the seat cushion. A bladder-type pressure sensor would need to cover the entire seat cushion in order to detect a seating force applied to the perimeter of the seat cushion, necessitating a larger and more expensive sensor than would be needed to merely detect an adult occupant in the central portion of the seat cushion.

Referring once again to FIG. 5, the sensor assembly 330 may further comprise a plate 64 that may be movably coupled to the base 32 via the support posts 36. The force transducer 34 may be affixed to a surface of this plate 64, preferably a bottom surface as shown in FIG. 4. The plate 64 is disposed within a portion of the seat cushion 26 that is in a location separate from the location of any of the sensing ends 444. The plate 64 is configured to apply a corresponding portion of the actuation force 50 to the force transducer 34 when a portion of the seating force 46 is applied to the plate 64. The plate 64 may be preferably coupled to the base 32 by a plurality of support posts 36. The plate 64 may be constructed of a material sufficient to withstand the forces applied to the sensor assembly 330 by the seating force 46. Preferably the plate 64 is constructed of a plastic such as acrylonitrile butadiene styrene (ABS).

The sensor assembly 30 may also include a plate spring 66 coupled between the support post or the base 32 and the plate 64 may be configured to provide a plate spring force 68 effective to apply the proper actuation force 50 to the force transducer 34 in relation to the seating force 46 applied to the plate 64. The plate spring 66 may be a compression spring, extension spring, leaf spring, cantilever spring, or elastomeric spring.

The advantage of the plate 64 is that the sensor assembly 330 may be configured to detect a seating force 14 exerted on a central portion of the seat cushion 26 as well as a perimeter portion of the seat cushion 26. Therefore, the sensor assembly 330 may also be capable of detecting an adult or other occupant that is occupying the central portion of the seat cushion 26.

The corresponding portion of the actuation force 50 applied to the force transducer 34 by the plate 64 may be applied by the contact of the force transducer 34 to an actuating end 548 of a lever in the plurality of levers 438. Alternatively, as shown in FIG. 5 the sensor assembly 330 may further comprise a pedestal 70 affixed to the base 32 and configured to cooperate with the plate 64 effective to apply the corresponding portion of the actuation force 50 to the force transducer 34. Alternatively, the pedestal 70 may be affixed to the force transducer 34.

The plurality of levers 438 in combination with the plate 64 shown in FIGS. 4 and 5 provides the advantage of determining the seating force 14 applied to a portion of the seat cushion 26 in two or more distinct locations using the sensor assembly 330 having a single force transducer 34. The sensor assembly 330 may be configured to locate a plurality of sensing ends 44 of the levers 438 near the perimeter of the seat bottom cushion 322 while locating the plate 64 under a central portion of the seat bottom cushion 322. Accordingly a seating force 14 applied to a large portion of the seat cushion 26 may be detected by the sensor assembly 330 having a single force transducer 34.

Returning now to FIG. 4, the sensor assembly 330 may further include a control unit 16. The sensor assembly 330 may further include a wireless transmitter 18 configured for electrical communication with the control unit 16 and/or a receiver 19, such as a key fob, located outside the vehicle 12 as shown in FIG. 1. The wireless transmitter 18 may be an active transmitter powered by en external electrical power source, such as a vehicle electrical system. Alternately the wireless transmitter 18 could be a passive transmitter that is powered by received radio frequency energy, such as a radio frequency identification (RFID) tag.

The sensor assembly 330 may also include a battery 72 configured to provide electrical power to the control unit 16 and or the wireless transmitter 18. The battery 72 may be a non-rechargeable battery, such as an air-zinc battery or a rechargeable battery, such as a lithium ion battery. The sensor assembly 330 may additionally include a wireless battery charger 74 configured to charge the rechargeable battery 72. The wireless battery charger 74 is configured to be inductively coupled to an external electrical power source (not shown). The inductively coupled external power source may be disposed in the vehicle 12, for example in a detachable base (not shown) of the child safety seat assembly 320. The wireless charger 74 may be integrated with the battery 72 to form a wireless battery pack, such as Model NC WL-01 available from Sanyo North America of San Diego, Calif. or Model QE-CV201 available from Panasonic Industrial Company of Rolling Meadows, Ill. Alternatively, embodiments may be envisioned wherein magnetic resonance coupled wireless charging may be desired.

Including the control unit 16, wireless transmitter 18, and battery 72, in the sensor assembly 330 may provide the advantage of a sensor assembly 330 that can detect a seating force 14 exerted on a portion of the seat cushion 26 whether the seat assembly 320 is disposed within the vehicle 12 or another location. In other words, the sensor assembly 330 may function in a stand-alone manner.

Including the wireless battery charger 74 in the sensor assembly 330 may provide the advantage of providing electrical power to the control unit 16 and wireless transmitter 18 without the need for electrical contacts between the sensor assembly 330 and an external electrical power source. An inductively coupled external power source disposed in the detachable base, the wireless battery charger 74 may charge the battery 72 when the seat assembly 320 is attached to the detachable base.

Although the preceding example describes detecting a child 21 in a child safety seat assembly 320, other embodiments of the sensor system 310 may be proposed to detect seating forces generated by other seat occupants in different seating environments and applications.

Figure 6:
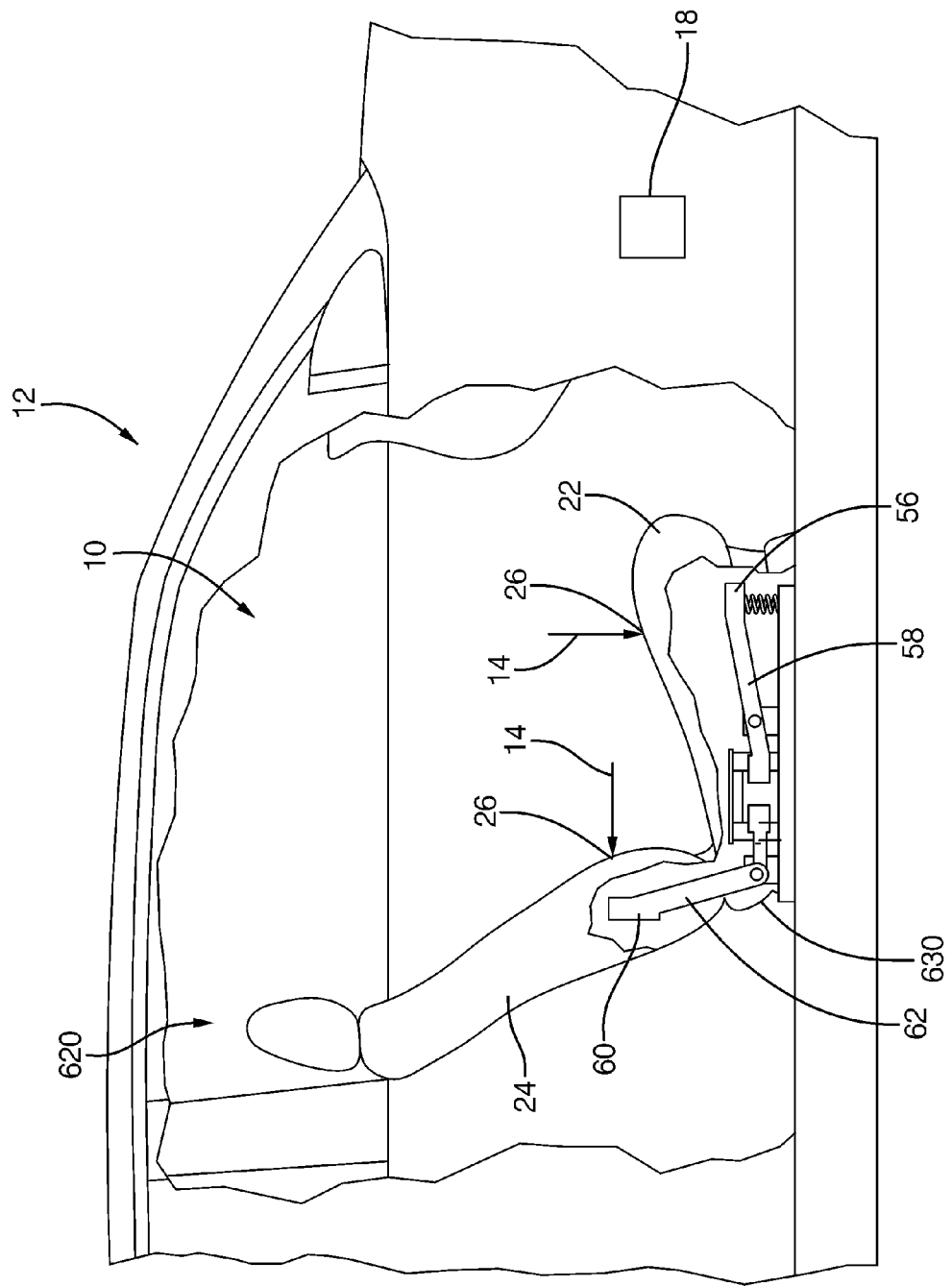
FIG. 6 illustrates a cut-away side view of a vehicle having a sensor assembly in accordance with a third embodiment disposed within a seat assembly.

In accordance with a third embodiment of a sensor assembly 630, FIG. 6 illustrates a non-limiting example of the sensor assembly 630 in which a first sensing end 56 of a first lever 58 is disposed within a seat bottom cushion 22. A second sensing end 60 of a second lever 62 is disposed within a seat back cushion 24. The sensor assembly 630 is configured to detect a portion of the seating force 14 exerted on a portion of the seat bottom cushion 22 of the seat assembly 620 while also configured to detect a portion of the seating force 14 exerted on a portion of the seat back cushion 24. Similarly to the sensor assembly 330 shown in FIGS. 4 and 5, a portion of the seating force 14 applied to a portion of the seat bottom cushion 22 operates on the first sensing end 56 of the first lever 58 causing a corresponding portion of the actuation force 50 to be applied to the force transducer 34 by the first actuating end 48 of the first lever 58. A portion of the seating force 14 applied to a portion of the seat back cushion 24 operates on the second sensing end 60 causing a corresponding portion of the actuation force 50 to be applied to the force transducer 34 by the second actuating end 48 of the second lever 62.

The sensor assembly 630 provides the advantage of determining the seating force 14 applied to a portion of two different seat cushions of the seat assembly 620.

Figure 7:
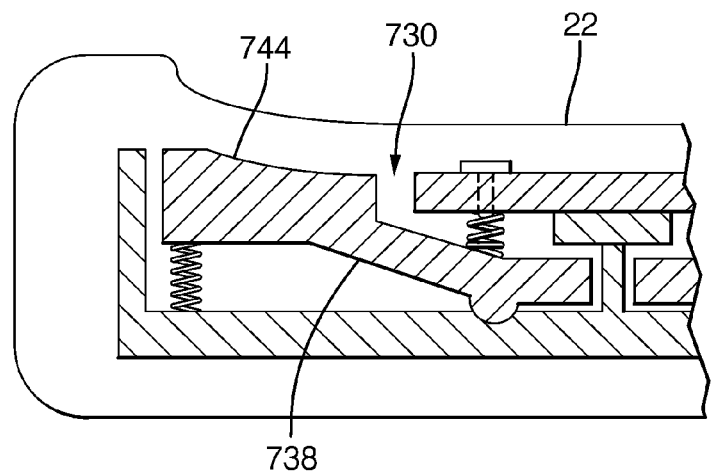
FIG. 7 illustrates a cross sectional side view of a sensor assembly in accordance with a fourth embodiment.

In accordance with a fourth embodiment of a sensor assembly 730, FIG. 7 illustrates a non-limiting example of a sensor assembly 730 wherein a sensing end 744 of a lever 738 is shaped to match or conform to a contour of the a portion of a seat bottom cushion 22 or a seat back cushion 24 proximate to the sensing end 744 of the lever 38. Additionally, the sensing end shape may be selected, such as a shaped plate, in order to minimize pressure points created by the sensing end 744 in the seat cushion that may felt by a seat occupant. Shaping the sensing end 744 of the lever 738 may beneficially affect the comfort of an occupant of the seat assembly 20.

In accordance with a fifth embodiment of a sensor system 810, FIG. 8 illustrates a non-limiting example of the sensor system 810 including a sensor assembly 830. The sensor assembly 830 is similar to the sensor assembly 330 shown in FIG. 4 and is configured with a plurality of force transducers 834. Each lever in the plurality of levers 438 may contact a separate force transducer in the plurality of force transducers 834. Likewise, a separate force transducer may be affixed to the plate 64. Each force transducer in the plurality of force transducers 834 may be connected to the control unit 16. According to this embodiment, it may be possible to determine the locations on the portions of the seat cushion 26 where the seating force 14 is applied, depending on which force transducers in the plurality of force transducers 834 are activated by the seating force 14. Based on this location information provided by the sensor assembly 830, the control unit 16 may be capable of discriminating between a child safety seat, which may exert a seating force 14 primarily on the perimeter of the seat bottom cushion 22 where the sensing ends 44 of the levers 438 are located, and an occupant in the seat that would primarily exert a seating force 14 on the plate 64 in the center of the seat bottom cushion 22.

Referring once more to FIG. 3, which further illustrates a non-limiting example of a sensor system 310 including a plurality of sensor assemblies 330 configured to expand the area in which the seating force 14 can be detected or to improve the resolution of detecting the seating force 14. The plurality of sensor assemblies 330 may include a force transducer 34 comprising a normally closed switch. The force transducer 34 in each sensor assembly 330 in the plurality of sensor assemblies 330 may be connected in a series circuit. Therefore, when any one of the sensor assemblies 330 detects a seating force 14 that exceeds the threshold, a force transducer will break the series circuit and the value of the sensor array output will change from a first value (on) to a second value (off).

Accordingly, sensor systems 10, 310, and 810 and seat assemblies 20, 320, and 620 with sensor assemblies 30, 230, 330, 630, 730, and 830 are provided. The sensor assemblies 30, 230, 330, 630, 730, and 830 advantageously provide the capability to determine the seating force 14 applied by an occupant to a portion of the seat cushion 26. The sensor includes a simple mechanical arrangement of a lever. The sensor assemblies 30, 230, 330, 630, 730, and 830 may allow the detection of a seating force 14 exerted on a portion of the seat cushion 26 remote from the force transducer 34, 834 that is typically in contact a child occupying the seat but not with an adult occupying the seat.

The sensor assemblies 330, 630, 730, and 830 may provide the advantage of determining the seating force 14 applied to a portion of the seat cushion 26 in two or more distinct locations. This may be advantageous because a child 21 occupying a child safety seat assembly 320 may not always contact a particular portion of the seat bottom cushion 322 due to placement on the seat bottom cushion 322, size differences between children, or movement of the child 21 while in the child safety seat assembly 320. Therefore, detecting a seating force 14 exerted on one of multiple separate portions of the seat bottom cushion 322 may adequately detect a child in a child safety seat.

While this invention has been described in terms of the disclosed embodiments thereof, it is not intended to be so limited, but rather only to the extent set forth in the claims that follow. Moreover, the use of the terms first, second, etc. does not denote any order of importance, but rather the terms first, second, etc. are used to distinguish one element from another. Furthermore, the use of the terms a, an, etc. do not denote a limitation of quantity, but rather denote the presence of at least one of the referenced items.

We claim:

1. A sensor assembly configured to detect a seating force exerted on a portion of a seat cushion of a seat, said assembly comprising:
   a base configured to be disposed within said seat cushion;
   a force transducer coupled to the base and configured to be disposed within the seat cushion adjacent the base, said force transducer configured to output a signal indicative of the seating force; and
   a lever pivotably configured to be disposed within the seat cushion and coupled to the base, wherein the lever defines a sensing end configured to be disposed proximate to said portion of the seat cushion such that the seating force operates on the sensing end, wherein the lever defines an actuating end configured to apply an actuation force to the force transducer proportional to the seating force.

2. The assembly of claim 1, further comprising a plurality of levers configured to be disposed within the seat cushion adjacent the base, wherein each sensing end of each lever in the plurality of levers is disposed in a separate location within said portion of the seat cushion, such that when a portion of the seating force is applied to one or more of the sensing ends, a corresponding one or more of the actuating ends applies a corresponding portion of the actuation force to the force transducer.

3. The assembly of claim 2, wherein a first sensing end is disposed within a seat bottom cushion and a second sensing end is disposed within a seat back cushion.

4. The assembly of claim 1, further comprising a plate configured to be disposed within the seat cushion and movably coupled to the base, wherein the force transducer is affixed to the plate, wherein the plate is disposed within a portion of the seat cushion in a location separate from the location of the sensing end, wherein the plate is configured to apply a corresponding portion of the actuation force to the force transducer when a portion of the seating force is applied to the plate.

5. The assembly of claim 4, further comprising a pedestal configured to be disposed within the seat cushion and affixed to the base, said pedestal configured to cooperate with the plate effective to apply a corresponding portion of the actuation force to the force transducer.

6. The assembly of claim 1, further comprising a spring configured to be disposed within the seat cushion and coupled to the base and the lever, wherein the spring is configured to exert a spring force on the lever effective to change the magnitude of the actuation force relative to the seating force.

7. The assembly of claim 1, wherein a signal value of the signal has a first value when the actuation force is below a threshold and the signal value has a second value when the actuation force is above the threshold.

8. The assembly of claim 1, wherein a signal value of the force transducer is proportional to the actuation force.

9. The assembly of claim 1, wherein the assembly includes a single force transducer configured to be disposed within the seat cushion.

10. The assembly of claim 1, wherein the lever is substantially non-compliant.

11. The assembly of claim 1, further comprising a wireless transmitter configured to be disposed within the seat cushion and configured for electrical communication with a control unit.

12. The assembly of claim 11, further comprising a battery disposed within the seat cushion and configured to provide electrical power to the wireless transmitter.

13. The assembly of claim 12, further comprising a wireless battery charger configured to be disposed within the seat cushion and configured to charge the battery.

14. The assembly of claim 1, wherein the sensing end is shaped to conform to a contour of the seat cushion.

15. A seat assembly configured to detect a seating force exerted on a portion of a seat cushion, said seat assembly comprising:
   a seat cushion, wherein the seat cushion defines a cavity;
   a base configured to be disposed within the cavity;
   a force transducer disposed within the cavity, coupled to the base, and configured to output a signal indicative of the seating force; and a lever pivotably disposed within the cavity and coupled to the base, wherein the lever defines a sensing end configured to be disposed proximate to said portion of the seat cushion such that the seating force operates on the sensing end, wherein the lever defines an actuating end configured to apply an actuation force to the force transducer proportional to the seating force.

16. The assembly of claim 15, further comprising a plurality of levers disposed within the cavity, wherein each sensing end of each lever in the plurality of levers is disposed in a separate location within said portion of the seat cushion, such that when a portion of the seating force is applied to one or more of the sensing ends, a corresponding one or more of the actuating ends applies a corresponding portion of the actuation force to the force transducer.

17. A sensor system configured to detect a seating force exerted on a portion of a seat cushion of a seat, said system comprising:
 a control unit;
 a base configured to be disposed within a seat cushion;
 a force transducer coupled to the base and disposed within the seat cushion adjacent the base, said force transducer configured to output a signal indicative of the seating force; and
 a lever pivotably coupled to the base, wherein the lever defines a sensing end configured to be disposed proximate to said portion of the seat cushion such that the seating force operates on the sensing end, wherein the lever defines an actuating end configured to apply an actuation force to the force transducer proportional to the seating force.

18. The system of claim 17, further comprising a plurality of levers disposed within the seat cushion adjacent the base, wherein each sensing end of each lever in the plurality of levers is disposed in a separate location within said portion of the seat cushion, such that when a portion of the seating force is applied to one or more of the sensing ends, a corresponding one or more of the actuating ends applies a corresponding portion of the actuation force to the force transducer.

* * * * *